United States Patent [19]
Nakase et al.

[11] 3,852,423
[45] Dec. 3, 1974

[54] INTERFERON INDUCER AND PROCESS FOR PREPARING THE SAME

[75] Inventors: Yasukiyo Nakase, Yokohama; Yasuhiko Kojima, Musashino, both of Japan

[73] Assignee: The Kitasato Institute, Tokyo, Japan

[22] Filed: Mar. 21, 1972

[21] Appl. No.: 236,670

[30] Foreign Application Priority Data
Mar. 22, 1971    Japan.................................. 46-15825

[52] U.S. Cl....................... 424/115, 195/96, 424/85
[51] Int. Cl............................................. C12d 13/00
[58] Field of Search ................. 195/96; 424/85, 115

[56] References Cited
UNITED STATES PATENTS

| | | | |
|---|---|---|---|
| 2,965,543 | 12/1960 | Thiece | 195/96 |
| 3,141,824 | 7/1964 | Dahlstrom | 195/96 |
| 3,577,319 | 5/1971 | Nielsen et al. | 195/96 |

OTHER PUBLICATIONS

ACTA Virologca, Vol. 10, pages 271–272, (1966).

*Primary Examiner*—Alvin E. Tanenholtz
*Attorney, Agent, or Firm*—Armstrong, Nikaido & Wegner

[57] ABSTRACT

An interferon inducer for preventing the viral infection diseases, prepared from the supernatant liquid of cultered medium, in which has been cultured *Bordetella pertusis,* or from a fraction obtained by disintegrating the cell body of *Bordetella pertusis* and then recovering the effective component therefrom.

4 Claims, No Drawings

INTERFERON INDUCER AND PROCESS FOR PREPARING THE SAME

This invention relates to an interferon inducer for the viral infection and to a process for preparing the same. More particularly, the invention pertains to an interferon inducer obtained by use of the supernatant of a liquid culture medium, or a liquid containing a disintegrated cell body of, a Phase III, Phase II or Phase I organism of *Bordetella pertusis*, [G.S. Wilson and A.A. Miles: Principles of Bacteriology and Immunity, Vol. 1, page 973 (5th ed., 1964), published from Edward Arnold Ltd. (London)] and to a process for preparing the said inducer.

An object of the present invention is to provide a process for preparing an interferon inducer from the supernatant of a liquid culture medium, in which has been cultured a Phase III, Phase II or Phase I organism of *Bordetella pertusis*.

Another object of the invention is to provide a process for preparing an interferon inducer from a fraction obtained by disintegrating the cell body of a Phase III, Phase II or Phase I organism of *Bordetella pertusis* and then removing lipopolysaccharide endotoxin and O-antigen from the somatic components of bacteria.

A further object of the invention is to provide an interferon inducer obtained according to any of the above-mentioned processes.

Heretofore, interferon inducers for preventing the viral infectious diseases have been well known according to many research reports such as, for example, Julius S. Youngner: Jour, General Physiology, 56 (1), Part 2, pages 25s–40s (1970); and J. Vilcek: Virology Monograph Vol. 6, Interferon (published from Springer-Verlag, 1969, Wien-New York), particularly pages 21–22. Typical examples of the known interferon inducers include various viruses, bacteria (particularly Gram-negative bacteria), lipopolysaccharide endotoxin of said bacteria, metabolic products of molds, polysaccharides and double stranded-RNA. All these interferon inducers, however, are toxic and, when administered, bring about such side effects as fever and the like, so that they have not been used so frequently.

According to the process of the present invention, it is possible to obtain an interferon inducer which is low toxic and which does not bring about any side effects. The process of the present invention is carried out ac-
A Phase III, Phase II or Phase I organism of *Bordetella pertusis* is subjected to shaking culture at 30° to 37°C. for 24 to 94 hours by use of a liquid medium such as a modified Cohen-Wheeler culture medium [S.M. Cohen and M.W. Wheeler. Am. J. of Public Health & Nations Health, Vol. 36, pp. 371–376 (1946)]. Thereafter, the supernatant of the cultured medium is recovered by centrifuge and then filtered under sterile conditions, and the filtrate is subjected to ultra-filtration or chromatography, whereby an effective fraction can be isolated. 2. A cultured cell body of the above-mentioned Phase III, Phase II or Phase I organism of *Bordetella pertusis* is once disintegrated by subjecting the cell body for 10 to 30 minutes to physical treatment such as sonic treatment or to mechanical treatment using a French press or shaker. Subsequently, the liquid containing the disintegrated cell body is centrifuged to obtain a supernatant liquid containing no substantial lipopolysaccharide endotoxin and O-antigen. The thus obtained supernatant liquid is purified according to chromatography using as the adsorbent DEAE-cellulose (diethylaminoethyl cellulose), Sephadex (a trademark for a dry insoluble powder composed of microscopic beads which are synthetic organic compounds derived from the polysaccharide dextran, manufactured and sold by Pharmacia Fine Chemicals, Inc., New Jersey, U.S.A.), or DEAE-Sephadex, whereby a desired effective fraction can be isolated. 3. The above-mentioned Phase III, Phase II or Phase I organism of *Bordetella pertusis* is cultured at 35° to 37°C. for 2 to 3 days in any one of a solid culture medium suitable for culturing *Bordetella pertusis* such as a charcoal medium, and the resulting cell body is treated in the same manner as above, whereby an effective fraction can be isolated as well.

Procedures for producing interferon inducers according to the present process are illustrated below with reference to examples, but the examples are merely illustrative and do not limit the scope of the present invention.

EXAMPLE 1

A Phase III organism of *Bordetella pertusis* was subjected to shaking culture at 35° to 37°C. for 72 hours in a modified Cohen-Wheeler culture medium. After the cultivation, the cultured liquid was centrifuged to obtain 1,000 ml. of a supernatant liquid. This supernatant liquid was filtered under sterile conditions, whereby 900 ml. of an effective fraction (A) was obtained.

In the same manner as in the case of the Phase III organism, 900 ml. of an effective fraction (B) was obtained by use of a Phase II organism of *Bordetella pertusis*.

In the same manner as in the case of the Phase III organism, 900 ml. of an effective fraction (C) was obtained by use of a Phase I organism of *Bordetella pertusis*.

The above-mentioned effective fraction (A) was concentrated to 50 ml. then this concentrate was purified according to chromatography using DEAE-Sephadex A-50 to obtain 50 ml. of an effective fraction. Then thus obtained effective fraction is purified similarly using Sephadex G-50 to obtain 50 ml. of another effective fraction.

EXAMPLE 2

A Phase III organism of *Bordetella pertusis* was cultured at 35° to 37°C. for 48 hours in a charcoalagar culture medium [J.R. Norris and D.W. Ribbons: Methods in Microbiology, pp. 4, 97 and 283 (1970), published from Academic Press Inc., London-New York]. Thereafter, 10 g. of the cell body collected was suspended in 100 ml. of a phosphate buffered-saline solution, and the resulting cell suspension was subjected for 30 minutes to 10 kc. sonic treatment to disintegrate the cell body. Subsequently, the liquid containing the disintegrated cell body was centrifuged to recover 90 ml. of a supernatant liquid. This supernatant liquid was treated according to chromatography using Sephadex G 150, whereby 40 ml. of an effective fraction (D-1) was obtained.

In the same manner as in the above, the Phase III organism of *Bordetella pertusis* was cultured at 35° to 37°C. for 72 hours, whereby 40 ml. of an effective fraction (D-2) was obtained.

In the same manner as in the case of the Phase III organism, 40 ml. of an effective fraction (E) was obtained by use of a Phase II organism of *Bordetella pertusis*.

In the same manner as in the case of the Phase III organism, 40 ml. of an effective fraction (F) was obtained by use of a Phase I organism of *Bordetella pertusis*. Further, the liquid containing the disintegrated cell body of the Phase I organism was centrifuged to obtain a supernatant liquid, which was then subjected to chromatography using DEAE-cellulose as the adsorbent, whereby 30 ml. of an effective fraction (G) was obtained.

The results of determination of interferon production of the effective fractions (A) to (G) obtained in Examples 1 and 2 are mentioned below with reference to the following reference examples.

REFERENCE EXAMPLE 1

Determination of production amounts of interferon (*in vitro* test):

A mixed solution comprising 1.4 parts by volume of a phosphate buffered-saline solution and 1 part by volume of Ringer's solution was mixed with 0.6 part by volume of a calf serum, and the resulting mixture was charged with 3 parts by volume of distilled water to prepare a hypotonic solution. Using this hypotonic solution, each of the effective fractions (A) to (G) was diluted to various concentrations to prepare diluted samples. On the other hand, a cell suspension was prepared in such a manner that a rabbit of 500 to 1,000 g. in body weight was sacrificed by cardiac puncture, the spleen and lymph node thereof were recovered, the tissues of said organs were torn with forceps to disperse cells, and the cells thus obtained were suspended in a culture medium to a concentration of $5 \times 10^7$ cells/dish for spleen and lymph node. Subsequently, each of the aforesaid diluted samples was mixed with the above-mentioned cell suspension and cultured at 25°C. for 24 hours, and the cultured liquid was centrifuged to obtain a supernatant liquid, which was then subjected to determination of interferon production. The results obtained were as set forth in Table 1.

(The titer of interferon was expressed in terms of the highest dilution causing a 50 percent inhibition of the number and size of plaques in comparison with untreated controls.)

Table 1

Determination of interferon production (*in vitro* test)

| | Sample | Concentration of sample | | Titer of interferon | |
|---|---|---|---|---|---|
| | | | | Spleen cell | Lymph node cell |
| 1. | Phase III organism of *Bordetella pertusis* | | | | |
| (1) | Supernatant liquid of cultured medium [Effective fraction (A)] | 10 100 1,000 | × dilution do. do. | 80 220 220 | 85 700 680 |
| (2) | Supernatant liquid of disintegrated cell body (48 hours culture) [Effective fraction (D-1)] | 100 1,000 10,000 100,000 | × dilution do. do. do. | 430 340 230 tc * | 330 310 330 100 |
| (2) | Supernatant liquid of disintegrated cell body (72 hours culture) [Effective fraction (D-2)] | 100 1,000 10,000 100,000 | × dilution do. do. do. | 500 36. 205 50 | * 230 220 85 |
| 2. | Phase II organism of *Bordetella pertusis* | | | | |
| (1) | Supernatant liquid of cultured medium (72 hours' culture) [Effective fraction (B)] | 100 1,000 | × dilution do. | 280 220 | * * |
| (2) | Supernatant liquid of disintegrated cell body (48 hours' culture) [Effective fraction (E)] | 100 1,000 | × dilution do. | 320 300 | * * |

Table 1—Continued

Determination of interferon production (in vitro test)

| | Sample | Concentration of sample | Titer of interferon | |
|---|---|---|---|---|
| | | | Spleen cell | Lymph node cell |
| 3. | Phase I organism of Bordetella pertusis | | | |
| (1) | Supernatant liquid of cultured medium [Effective fraction (C)] | 20 × dilution | 106 | 17 |
| | | 100 do. | 320 | 52 |
| | | 500 do. | 160 | 72 |
| (2) | Supernatant liquid of disintegrated cell body [Effective fraction (F)] | Containing 10 μg. of solid per ml. (untreated) | 930 | 240 |
| | | do. (treated at 56°C. for 30 minutes) | 1,400 | * |
| (3) | Necrotoxin [Effective fraction (G)] | 10 Times-dilution of liquid containing 45 μg of solid per ml. | 720 | 1,900 |
| | | 50 Times-dilution of said liquid | 630 | 1,900 |
| | | 250 Times-dilution of said liquid | 230 | * |

(* not conducted)

REFERENCE EXAMPLE 2

Determination of interferon production (in vivo test):

Each of the diluted samples prepared in Reference Example 1 was administered in a does of 0.5 ml. by intravenous injection to a rabbit of 500 to 1,000 g. in body weight. At the 2nd and 5the hours after the injection, each 3 ml. of the blood of the rabbit was taken up by cardiac puncture, and the serum isolated from said blood was subjected to determination of interferon production in the same manner as in Reference Example 1. The results obtained were as set forth in Table 2.

Table 2

Determination of interferon production (in vivo test)

| | Sample | Concentration of sample | Rabbit No. | Titer of interferon | |
|---|---|---|---|---|---|
| | | | | After 2 hrs. | After 5 hrs. |
| 1. | Phase III organism of Bordetella pertusis Supernatant liquid of cultured medium [Effective fraction (A)] | 10 × dilution | 7 | 490 | 50 |
| | | do. | 8 | 1800 | 210 |
| 2. | Phase I organism of Bordetella pertusis | | | | |
| (1) | Supernatant liquid of cultured medium [Effective fraction (C)] | 10 × dilution | 1 | 600 | 40 |
| | | do. | 2 | 2200 | 130 |
| | | do. | 3 | 2200 | 210 |
| (2) | Supernatant liquid of disintegrated cell body [Effective fraction (F)] | Containing 10 μg. of solid per ml. (untreated) | 4 | 1200 | 40 |
| | | do. (treated at 56°C. for 30 minutes) | 5 | 1250 | * |
| (3) | Necrotoxin [Effective fraction (G)] | 500 μg/kg.wt. (untreated) | 6 | 340 | 40 |
| | | do. (treated at 56°C. for 30 minutes) | 9 | 43 | less than 10 |

(* not conducted)

As is clear from the results shown in Tables 1 and 2, it was confirmed that the supernatants of cultured media and disintegrated cell bodies of the Phase III, II and I organisms of *Bordetella pertusis* produced interferons both in vitro and in vivo tests using rabbits. Particularly, it was observed that the supernatants obtained from the Phase III organism of *Bordetella pertusis* were lowest in toxicity and excellent in effect of inducing the interferon production.

Further, it was confirmed that virus-inhibiting factors induced by the interferon inducers obtained according to the present process were not effective on chicken embryo cells different in species, had actions of inhibiting the propagation of visicular stomatites virus and vaccinia virus on lined cell RK. 13, and had such characteristics of interferons that they were inactivated with 0.08 % trypsin at 37°C., did not precipitate even when centrifuged with a centrifugal force of 100,000 g. and were not dialyzed with a cellophane bag.

What is claimed is:

1. A process for the preparation of an interferon inducer for viral infections which comprises culturing phase II or III *Bordetella pertusis* in a liquid culture medium, separating a supernatant liquid from the cultured medium, filtering the thus obtained supernatant under sterile condition to obtain a filtrate, extracting the thus obtained filtrate by ultra filtration or chromatography to obtain the effective fraction, said effective fraction being capable of providing an interferon inducing effect.

2. An interferon inducer effective for viral infections comprising an effective fraction of *Bordetella pertusis* produced by culturing *Bordetella pertusis* in a liquid culture medium, separating a supernatant liquid from the cultured medium, filtering the thus obtained supernatant under sterile conditions to obtain a filtrate, extracting the thus obtained filtrate by ultra filtration or chromatography to obtain said effective fraction virus inhibiting factors induced by said effective fraction having the characteristics of (i) not affecting the chicken embryo cells in different species; (ii) inhibiting the propagation of visicular stomatities virus and of vaccinia virus on lined cell RK-13; (iii) being inactivated with 0.08% trypsin at 37°C; (iv) not being precipitated even when centrifuged with a centrifugal force of 100,000 g.; and (v) not being dialyzed with a cellophane bag, the *Bordetella pertusis* being a phase III or phase II organism of *Bordetella pertusis*.

3. An interferon inducer according to claim 2 wherein the *Bordetella pertusis* is in phase III.

4. A process according to claim 1, wherein *Bordetella pertusis* is cultured in shaking culture by using a modified Cohen - Wheeler liquid medium at 35° to 37° C for 24 to 72 hours.

* * * * *